United States Patent

Toriyama (10) Patent No.: US 10,444,898 B2
(45) Date of Patent: Oct. 15, 2019

(54) IMAGE READING APPARATUS WITH SHEET CONVEYOR AND OPERATION PANEL

(71) Applicant: KONICA MINOLTA, INC., Tokyo (JP)

(72) Inventor: Hideyuki Toriyama, Tokokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/162,800

(22) Filed: Oct. 17, 2018

(65) Prior Publication Data

US 2019/0129566 A1    May 2, 2019

(30) Foreign Application Priority Data

Oct. 27, 2017 (JP) .................................. 2017-207827

(51) Int. Cl.
| | |
|---|---|
| *G06F 3/12* | (2006.01) |
| *G06F 3/041* | (2006.01) |
| *H04N 1/04* | (2006.01) |
| *H04N 1/00* | (2006.01) |
| *G06F 1/16* | (2006.01) |
| *G09G 3/20* | (2006.01) |
| *G06F 3/0488* | (2013.01) |

(52) U.S. Cl.
CPC .......... *G06F 3/0416* (2013.01); *G06F 1/1601* (2013.01); *G09G 3/20* (2013.01); *H04N 1/00411* (2013.01); *H04N 1/04* (2013.01); *G06F 3/0488* (2013.01); *G09G 2340/0492* (2013.01)

(58) Field of Classification Search
None
See application file for complete search history.

(56) References Cited

U.S. PATENT DOCUMENTS 8,953,224 B2 * 2/2015 Mok .................. H04N 1/00384
  16/319
2002/0191980 A1 * 12/2002 Kudo ................. G03G 15/5016
  399/81

(Continued)

FOREIGN PATENT DOCUMENTS

| JP | H09-80986 A | 3/1997 |
| JP | 2008-263268 A | 10/2008 |

(Continued)

*Primary Examiner* — Henok Shiferaw
(74) *Attorney, Agent, or Firm* — Buchanan Ingersoll & Rooney PC (57) ABSTRACT

An image reading apparatus for reading an image from a sheet includes: a scanner including a platen glass; a sheet conveyer that rotates around an axis on a rear surface side and is provided to be openable/closable; and an operation panel including a rectangular image display surface, wherein the sheet conveyer includes a document tray, a sheet discharge surface, and a conveying part arranged at one side of the document tray in a horizontal direction as viewed from a front side and conveys the sheet, and the operation panel is arranged in a positional range not overlapping with the conveying part back and forth so that the vertical image display surface faces obliquely forward and upward as viewed from the front side and has a size from a position of the platen glass on the front side and a position higher than the sheet discharge surface.

12 Claims, 5 Drawing Sheets

(56) References Cited

U.S. PATENT DOCUMENTS

| | | | | |
|---|---|---|---|---|
| 2010/0091315 A1* | 4/2010 | Shiraki | ............ | G03G 15/5016 358/1.13 |
| 2012/0188589 A1* | 7/2012 | Potter | ............... | H04N 1/00411 358/1.15 |
| 2018/0027134 A1* | 1/2018 | Sugawara | .......... | H04N 1/00392 |
| 2018/0284940 A1* | 10/2018 | Chin | ................. | G03G 15/5016 |

FOREIGN PATENT DOCUMENTS

| JP | 2015-114345 A | 6/2015 |
|---|---|---|
| JP | 2017-096995 A | 6/2017 |

\* cited by examiner

IMAGE READING APPARATUS WITH SHEET CONVEYOR AND OPERATION PANEL

The entire disclosure of Japanese patent Application No. 2017-207827, filed on Oct. 27, 2017, is incorporated herein by reference in its entirety.

BACKGROUND

Technological Field

The present invention relates to an image reading apparatus.

Description of the Related Art

An OA apparatus such as a copier, a facsimile, and a Multi-functional Peripheral (MFP) includes an image reading apparatus which reads an image from a sheet-like document.

Generally, this kind of image reading apparatus includes a flat-bed-type scanner and an automatic document feeder (ADF). The automatic document feeder is arranged on the upper side of the scanner so as to be openable/closable as a cover of a platen glass of the scanner. The sheet-like document is normally set in a document tray in a state where the automatic document feeder is closed. A thick document such as a book is placed on the platen glass in a state where the automatic document feeder is opened.

In recent years, the size of a display screen of an operation panel of the MFP has been increased, and naturally, the size of the operation panel has been increased. Due to the increase in the size of the operation panel, it is difficult to reduce the size of the MFP.

JP 2017-96995 A, JP 2015-114345 A, JP 9-80986 A, and JP 2008-263268 A are related art relating to an operation panel which improves usability of the OA apparatus.

JP 2017-96995 A discloses an image forming apparatus in which a user can select a height position where the operation panel is attached between a lower position with which access to a document glass surface in the upper part of the apparatus is relatively easy and a higher position with which a front cover is easily opened/closed.

JP 2015-114345 A discloses an image forming apparatus in which an operation panel provided on the front side is manually retracted to the side of the side surface at the time when the front cover is opened/closed.

JP 9-80986 A discloses an image forming apparatus in which an operation panel which normally faces upward is automatically rotated to face forward when the front cover is opened.

JP 2008-263268 A discloses a copier which includes an operation panel which can be rotated to face forward and upward and in which a document cover on an upper surface is opened in conjunction with rotation of the operation panel to face upward by a user.

In a case where the operation panel is arranged on the front side of the platen glass, a display of the operation panel has usually had a laterally long (horizontally long) shape as viewed from the front side. That is, the display is arranged to be suitable for displaying a landscape-type operation screen.

However, in recent years, with the rise of smartphones, an input operation on a portrait-type screen has become an everyday affair, and the number of users who feel discomfort with a vertical (vertically long) display is decreasing. It is considered that the number of users who prefer the portrait-type operation screen increases in the future.

SUMMARY

The present invention has been made in view of above problems, and an object of the present invention is to provide an image reading apparatus which is easily operated with a portrait-type operation screen and which can be easily miniaturized.

To achieve the abovementioned object, according to an aspect of the present invention, there is provided an image reading apparatus for reading an image from a sheet, and the image reading apparatus reflecting one aspect of the present invention comprises: a scanner including a platen glass on which the sheet can be placed; a sheet conveyer that rotates around an axis on a rear surface side and is provided to be openable/closable so as to be a cover for covering the platen glass; and an operation panel including a rectangular image display surface having short sides and long sides, wherein the sheet conveyer includes a document tray, a sheet discharge surface provided below the document tray, and a conveying part which is arranged at one side of the document tray in a horizontal direction as viewed from a front side and conveys the sheet from the document tray to the sheet discharge surface, and the operation panel is arranged in a positional range not overlapping with the conveying part back and forth in the horizontal direction so that the vertical image display surface faces obliquely forward and upward as viewed from the front side and has a size from a position of the platen glass on the front side and a position higher than the sheet discharge surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1A:
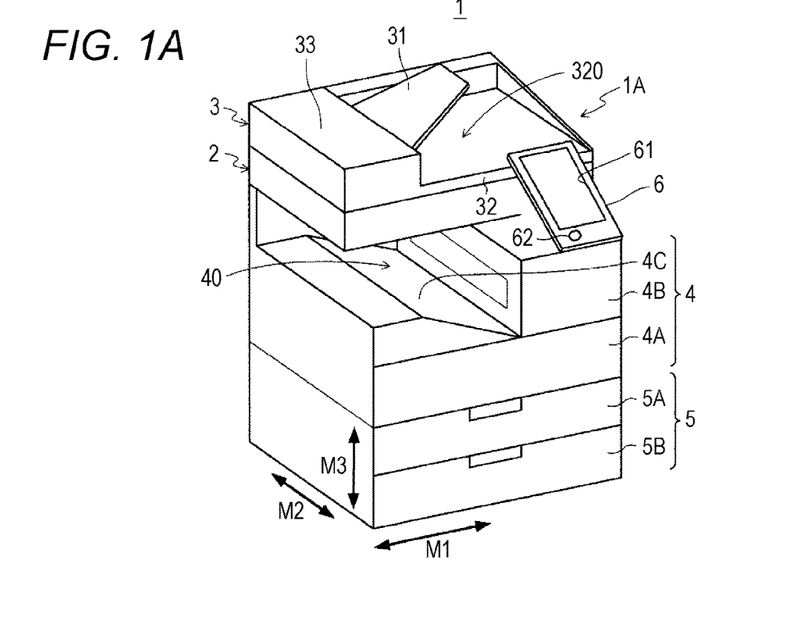
FIGS. 1A and 1B are diagrams of an example of an appearance of an image forming apparatus including an image reading apparatus according to an embodiment of the present invention.
Figure 1B:
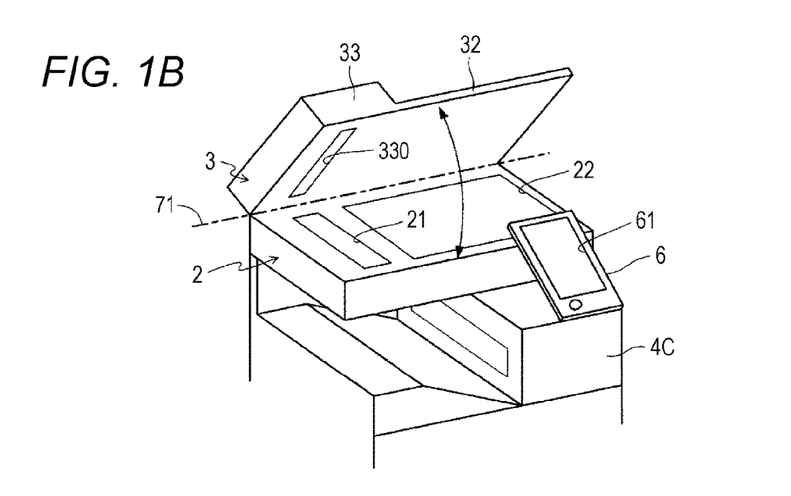
Figure 2:
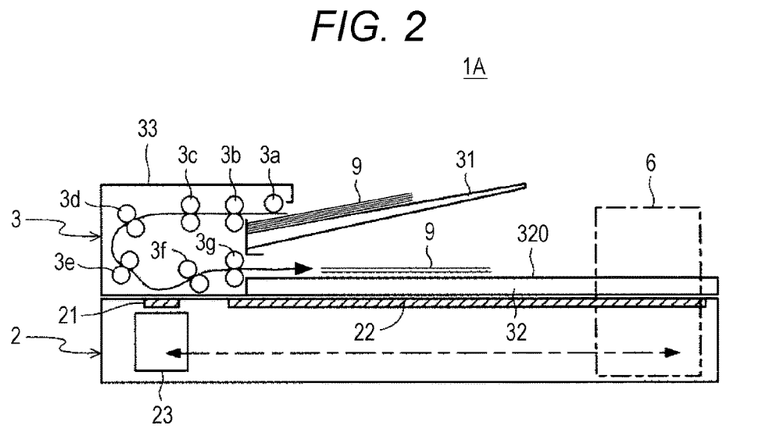
FIG. 2 is a diagram of an exemplary internal configuration of the image reading apparatus.
Figure 3:
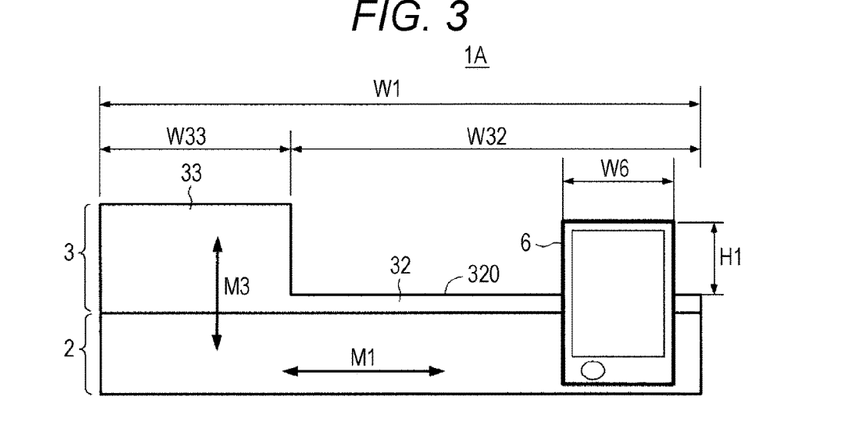
FIG. 3 is a diagram of dimensional conditions in the horizontal direction of the image reading apparatus.

FIGS. 1A and 1B illustrate an example of an appearance of an image forming apparatus 1 including an image reading apparatus 1A according to an embodiment of the present invention, FIG. 2 illustrates an exemplary internal configuration of the image reading apparatus 1A, and FIG. 3 illustrates a dimensional condition in a horizontal direction M1 of the image reading apparatus 1A.

In FIG. 1A, the image forming apparatus 1 is a Multi-functional Peripheral (MFP) that integrates functions of a copier, an image reader, a facsimile, and the like.

The image forming apparatus 1 includes a flat-bed-type scanner 2, an automatic document feeder (ADF) 3, a printer 4, a sheet feeder 5, and an operation panel 6. In the image forming apparatus 1, a part including the scanner 2, the automatic document feeder 3, the operation panel 6 forms the image reading apparatus 1A. The automatic document feeder 3 is an example of a sheet conveyer.

The image forming apparatus 1 according to the present embodiment employs an intracavity sheet discharge method for discharging a printed sheet to a space below the scanner 2. With the intracavity sheet discharge method, a floor area required for installing the image forming apparatus 1 can be smaller than a method for discharging the sheet to a space on a side of the printer 4.

The printer 4 includes a printer engine 4A which prints an image on a sheet by , for example, electrophotography, a sheet discharge mechanism 4B which discharges the sheet conveyed from the printer engine 4A below the discharge mechanism 4B along the horizontal direction, and a sheet discharge tray 4C on which the discharged sheets are stacked.

The sheet discharge mechanism 4B is arranged at the right end of the image forming apparatus 1 in a horizontal direction M1 as viewed from the front side, and the sheet discharge tray 4C is arranged on the left side of the sheet discharge mechanism 4B. An intracavity sheet discharge space 40 near the sheet discharge tray 4C opens toward the front side and the left side of the image forming apparatus 1.

The printer 4 prints the image read by the scanner 2 in a copy job on one side or both sides of the sheet fed from the sheet feeder 5. The printer 4 is also used to print a document input from external host or read from an internal box and an image received through facsimile communication. A printing method is not limited to the electrophotographic method and may be an inkjet-method or other method.

The sheet feeder 5 is arranged below the printer 4 and includes a plurality of drawer-type sheet storage units 5A and 5B. The sheet feeder 5 extracts a sheet from selected one of the sheet storage units 5A and 5B and supplies the sheet to the printer 4.

The scanner 2 and the automatic document feeder 3 are arranged on the upper side of the printer 4, and right parts of the scanner 2 and the automatic document feeder 3 are supported by the sheet discharge mechanism 4B.

External dimensions in the horizontal direction M1 of the scanner 2, the automatic document feeder 3, the printer 4, and the sheet feeder 5 are substantially equal to each other. However, regarding the external dimension of the image forming apparatus 1 in the front-back direction M2, the scanner 2 and the automatic document feeder 3 are shorter than the printer 4 and the sheet feeder 5. Therefore, the printer 4 and the sheet feeder 5 are projected forward relative to the scanner 2 and the automatic document feeder 3.

In FIGS. 1B and 2, the scanner 2 includes a slit glass 21, a platen glass 22, and a scanning optical system 23 and can read a sheet which is passing through the scanner 2 or placed on the scanner 2.

The slit glass 21 used to read the sheet which is passing through the scanner 2 has a band-like shape long in the front-back direction M2 and is provided in a left half of the scanner 2. A sheet smaller than the maximum reading size can be placed on the platen glass 22. The platen glass 22 is arranged on the right side of the slit glass 21.

The optical system 23 is provided to be movable in the horizontal direction M1, stops below the slit glass 21 when reading the sheet which is passing through the scanner 2, and moves below the platen glass 22 when reading the sheet placed on the platen glass 22.

The automatic document feeder 3 includes a document tray 31, a sheet discharge tray 32, and a conveying part 33 and conveys a sheet-like document 9 when reading the sheet which is passing through the scanner 2. The automatic document feeder 3 is provided to be openable and closable and rotates around a rotation axis 71 provided on the rear surface side to be a cover for covering the platen glass 22. A closed state is illustrated in FIG. 1A, and an opened state is illustrated in FIG. 1B. The bottom surface of the automatic document feeder 3 includes an opening 330 where the document 9 faces to the slit glass 21.

In the automatic document feeder 3, a structure is employed in which the sheet discharge tray 32 is arranged below the document tray 31 and the conveying part 33 is arranged on one side of the document tray 31 and the sheet discharge tray 32. With this structure, the external dimension can be smaller than the structure in which the document tray and the sheet discharge tray are arranged so as to discharge sheets in the same direction as a sheet feeding direction.

In the present embodiment, the conveying part 33 is arranged close to the left end in the horizontal direction M1. That is, parts necessary for conveyance such as a plurality of rollers 3a to 3g and motors for driving the rollers are concentrated on the left end.

In FIG. 2, the document 9 placed on the document tray 31 is introduced in a conveyance path in the conveying part 33 one by one from the uppermost sheet by the pickup roller 3a and the pair of sheet feeding rollers 3b and is conveyed from right to left toward the pair of resist rollers 3d by the pair of intermediate rollers 3c. The pair of resist rollers 3d corrects a skew of the single document 9 which has been conveyed and feeds the document 9 toward the pair of conveyance rollers 3e at a predetermined timing in synchronization with the scanner 2. The fed document 9 is guided downward and conveyed to the right side of the pair of conveyance rollers 3e. At this state, the front and the rear surfaces of the document 9 are reversed. In the middle pf the path from the pair of conveyance rollers 3e to the pair of conveyance rollers 3f, the lower surface of the document 9 faces to the slit glass 21, and the optical system 23 reads the image via the slit glass 21 to form image data. Thereafter, the document 9 is discharged to the sheet discharge tray 32 by the sheet discharge roller 3g in a state where the front and the rear surfaces are reversed.

Returning to FIGS. 1A and 1B, since the document tray 31 is arranged to be projected from the conveying part 33, naturally, the height of the housing of the conveying part 33 (dimension of image forming apparatus 1 in vertical direction M3) is higher than the height of the sheet discharge tray 32 positioned below the document tray 31. That is, in the closed state as illustrated in FIG. 1A, the upper surface of the conveying part 33 is higher than a sheet discharge surface 320 which is the upper surface of the sheet discharge tray 32.

The operation panel 6 is an input/output means for operating the image forming apparatus 1 by a user and used for not only an operation of a job using the scanner 2 such as copying but also an operation performed without using the scanner 2 such as printing documents in a box and the like.

The operation panel 6 includes a touch panel display 61 and one or more hard keys 62. The touch panel display 61 is an input/output device which displays various operation screens to which a user inputs an instruction or information or which delivers a message to the user and detects a touch operation to the operation screen. The instructions may be input through the touch panel display 61 without providing the hard keys 62.

The shape of an image display surface (also touch input surface) of the touch panel display 61 is a rectangle having short sides and long sides. A ratio of the long side relative to the short side is preferably a value larger than 1.33 which is a value of a screen of the Video Graphics Array (VGA). More preferably, the ratio is equal to or more than 1.4 which is about the same as the ratio of sheets of A size or B size.

The operation panel 6 is attached to an upper surface of a part of the sheet discharge mechanism 4B of the printer 4 which is projected forward from the scanner 2 and is arranged within a positional range not overlapping with the conveying part 33 back and forth in the horizontal direction M1 so as not to interfere opening/closing the automatic document feeder 3.

To increase the size of the touch panel display 61 while preventing an increase in the dimension of the image forming apparatus 1 in the front-back direction M2, the operation panel 6 is not arranged in a horizontal posture or vertical posture and is arranged in an inclined posture so that the image display surface of the touch panel display 61 faces obliquely forward and upward. The operation panel 6 has a size from the position of the front side of the platen glass 22 to the position higher than the sheet discharge surface 320.

The outer shape of the operation panel 6 is a rectangle which is long in a direction parallel to the long sides of the touch panel display 61. The operation panel 6 does not need have a rectangular shape and can have any shape. However, a long shape in the direction same as the long side of the touch panel display 61 is preferable for reducing the size in the horizontal direction M1.

In the image forming apparatus 1, the operation panel 6 is vertically placed. That is, the operation panel 6 is arranged so that the long sides of the outer shape are arranged along the front-back direction M2 and the vertical direction M3 and the short sides are arranged along the horizontal direction M1. With this arrangement, the touch panel display 61 is vertically placed as viewed from the front side. In particular, when viewing from the front side and obliquely upside which is a normal line of sight at the time when the user operates the image forming apparatus 1, the vertical touch panel display 61 can be seen in front.

For example, when a vertical document image is previewed, the vertical touch panel display 61 can display the entire image to be larger and easier to be seen than a case of a horizontal display as in the related art. Furthermore, a portrait-type operation screen to be displayed can provide an operation environment similar to a smartphone to a user.

As illustrated in FIG. 3, an external dimension W6 of the operation panel 6 in the short-side direction is set to be equal to or shorter than a dimension W32 of the sheet discharge tray 32 in the horizontal direction M1. The dimension W32 is obtained by subtracting a dimension W33 of the conveying part 33 from the external dimension W1 of the image reading apparatus 1A in the horizontal direction M1.

Furthermore, as illustrated in FIG. 3, a position of the upper edge (upper end position) of the operation panel 6 as viewed from the front side is higher than the sheet discharge surface 320 by a height H1.

Figure 4:
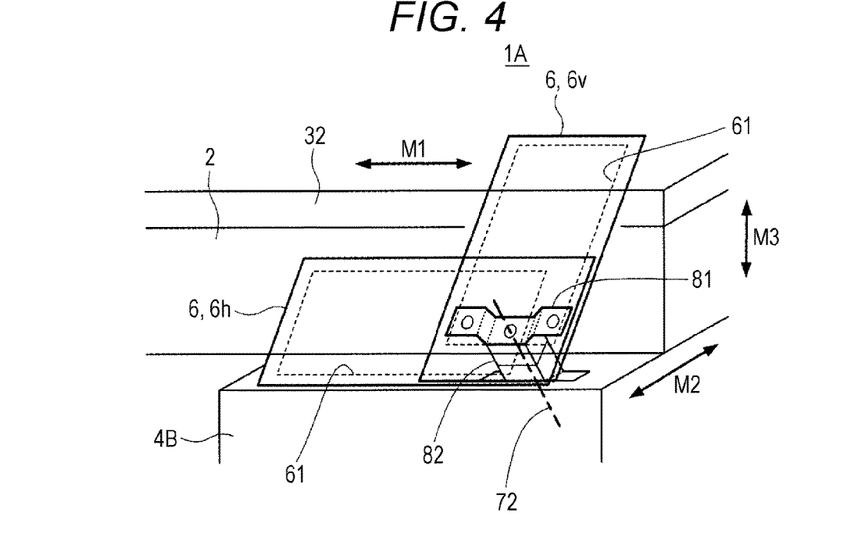
FIG. 4 is a diagram schematically illustrating an example of an operation panel mounting structure in the image reading apparatus.
Figure 5A:
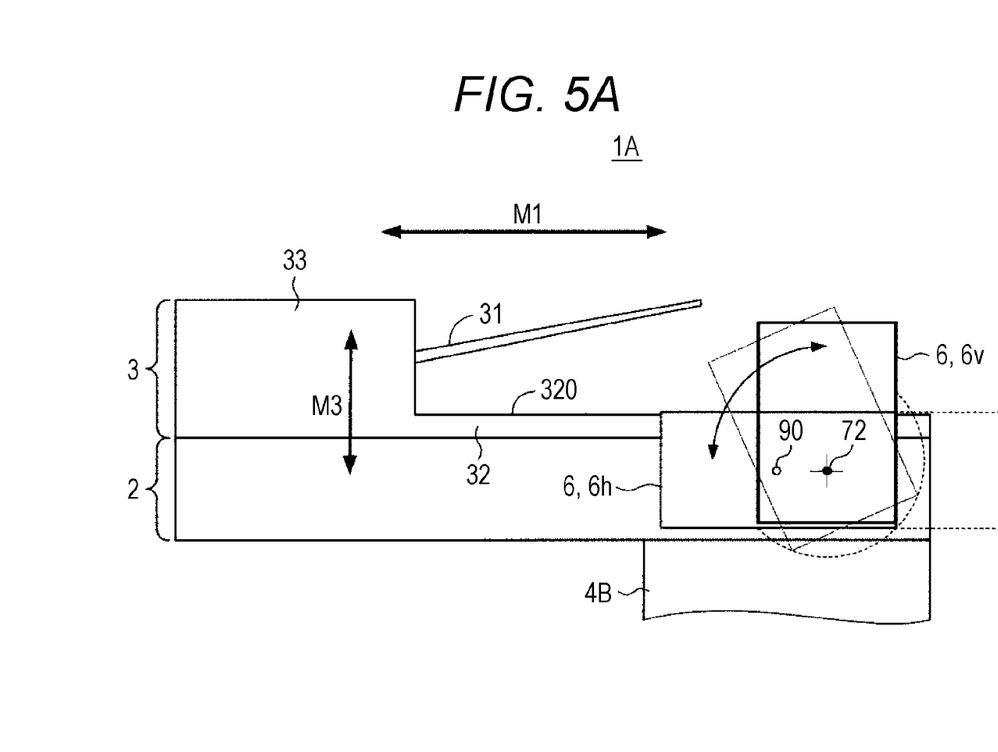
FIGS. 5A and 5B are diagrams of examples of a position of a rotation axis of the operation panel.
Figure 5B:
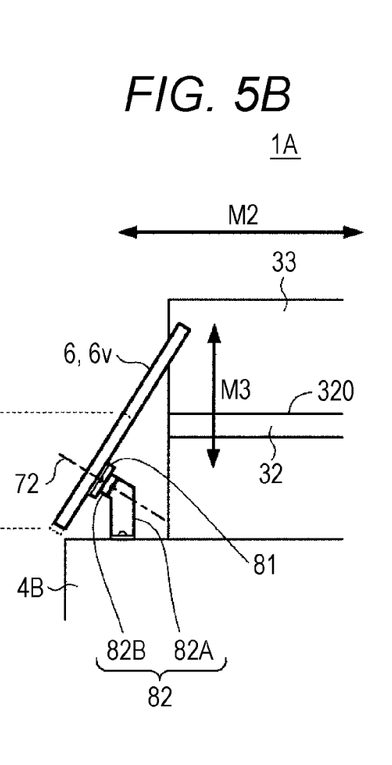

FIG. 4 schematically illustrates a state where the direction of the operation panel 6 in the image reading apparatus 1A is changed, and FIGS. 5A and 5B illustrate examples of arrangement of the rotation axis 72 of the operation panel 6. In FIGS. 5A and 5B, the structure of the image reading apparatus 1A viewed from the front side is illustrated in the left part, and the structure of the image reading apparatus 1A viewed from the right side is illustrated in the right part.

As illustrated in FIG. 4, the operation panel 6 is provided to be rotatable at least about 90 degrees by the rotation axis 72 so that the vertical direction of the touch panel display 61 is changed to the horizontal direction while the touch panel display 61 is oriented obliquely upward and forward. Details are as follows.

The operation panel 6 is attached on the upper surface of the sheet discharge mechanism 4B with an attaching member 81 and a supporting arm 82 interposed therebetween. As illustrated in FIGS. 5A and 5B, the supporting arm 82 includes a main body 82A which is fixed to the sheet discharge mechanism 4B so as to project upward from the sheet discharge mechanism 4B and a movable part 82B which is coupled to the main body 82A so as to rotate by 90 degrees around the rotation axis 72. The attaching member 81 is attached on the rear surface of the operation panel 6 and is coupled to the movable part 82B so that the operation panel 6 is rotatably supported around the rotation axis 72.

The movable part 82B includes a mechanism for positioning the operation panel 6 (for example, notch mechanism) so as to be stable without freely rotating at an angle and a position at which the operation panel 6 is vertically and horizontally placed. It is assumed that a holding force for positioning be set to be a degree of strength with which the user can rotate the operation panel 6 by hand. The user can change the position from the vertical position to the horizontal position or return the position to the vertical position. Note that the operation panel 6 may be electrically rotated instead of manual rotation.

Hereinafter, there are cases where the vertically placed operation panel 6 is referred to as an "operation panel 6v" and the horizontally placed operation panel 6 is referred to as an "operation panel 6h".

As illustrated in FIGS. 5A and 5B, the rotation axis 72 of the operation panel 6 is provided at a position close to a side remote from the conveying part 33 relative to a central position 90 of the horizontally placed operation panel 6h in the horizontal direction M1.

In other words, in the present embodiment, the position of the rotation axis 72 of the operation panel 6 is substantially the center of the short-side direction and a position apart from the lower short side of the vertically placed operation panel 6v, that is, the right short side of the horizontally placed operation panel 6h by a distance of a half of the short side. Therefore, the right end positions of the vertically placed operation panel 6 and the horizontally placed operation panel 6 are substantially the same. Accordingly, the operation panel 6 can be arranged at a position apart from the conveying part 33 so as not to project from the scanner 2 in the horizontal direction M1 when the operation panel 6 is rotating.

In the examples in FIGS. 5A and 5B, since the rotation axis 72 is provided on the right side of the central position 90, when the vertically placed operation panel 6v is rotated so as to be tilted to the left side, the position of the operation panel 6 is changed to be horizontally placed position. When the operation panel 6 is horizontally placed, the upper end of the operation panel 6 is lower than that of the vertically placed operation panel 6.

By moving the operation panel 6 apart from the conveying part 33, the operation panel 6 hardly interferes an operation for removing the document 9 from the sheet discharge tray 32 in comparison with a case where the operation panel 6 is arranged near the conveying part 33. Especially, since the vertically placed operation panel 6v is more largely projected upward from the sheet discharge surface 320 than the horizontally placed operation panel 6, a larger effect that the document 9 is easily removed and that is caused by moving the vertically placed operation panel 6v away from the conveying part 33 can be obtained.

Figure 6A:
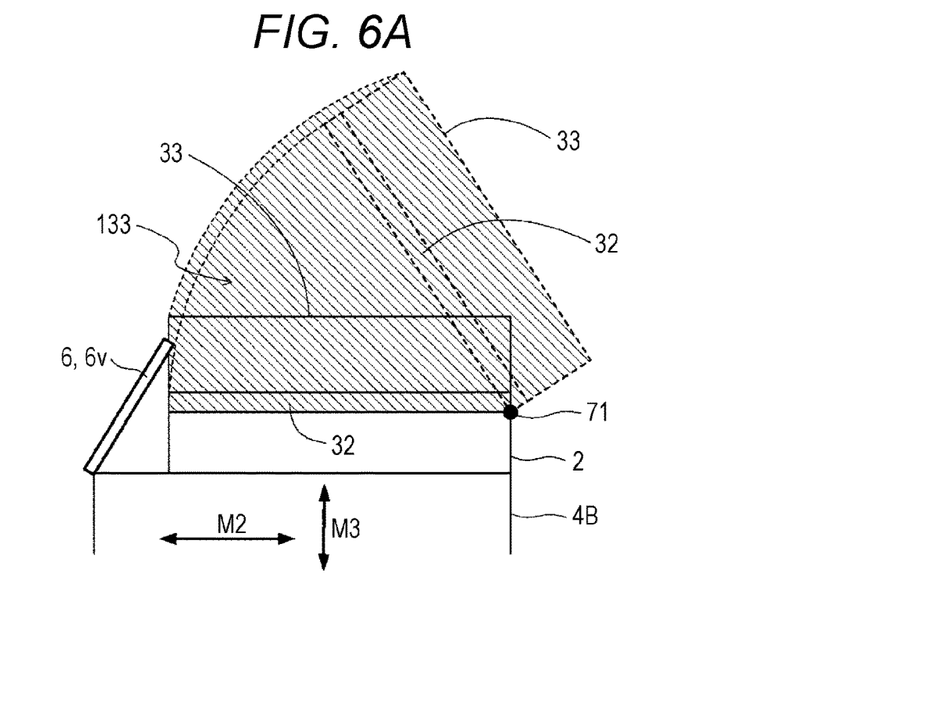
FIGS. 6A and 6B are diagrams of positional relationship between a movable range in which an automatic document feeder opens and closes and the operation panel.
Figure 6B:
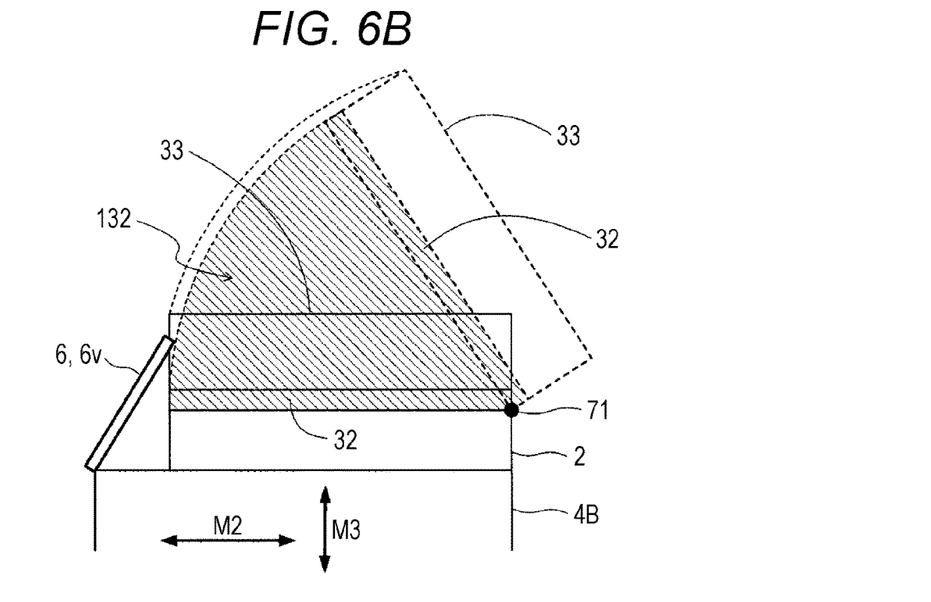

FIGS. 6A and 6B illustrate positional relationship between movable ranges 132 and 133 in which the automatic document feeder 3 opens and closes and the operation panel 6. In FIGS. 6A and 6B, the movable ranges 132 and 133 are hatched.

In the vertically placed state, the operation panel 6v is positioned in the movable range 133 of the conveying part 33 as the opening/closing of the automatic document feeder 3 is viewed from one end of the horizontal direction M1 (on side of right surface in example in FIGS. 6A and 6B). However, the operation panel 6v is not positioned in the movable range 132 of the sheet discharge tray 32. That is, for easy operation of the user who operates the operation panel 6v in a posture for looking down the operation panel 6v, the operation panel 6v is arranged to be horizontally closer to the automatic document feeder 3 as possible so as not to interfere the opening/closing of the automatic document feeder 3.

According to the above embodiment, since the touch panel display 61 is vertically placed, the operation with the portrait-type operation screen is easily performed. In addition, since the operation panel 6 is inclined upward, the image reading apparatus 1A which is easily downsized in the front-back direction M2 can be provided.

Furthermore, since the operation panel 6 is arranged in the positional range not overlapping with the conveying part 33 back and forth, it is possible to increase the size of the operation panel 6 so as not to interfere with the opening/closing of the automatic document feeder 3 to enlarge the screen of the touch panel display 61.

In the embodiment described above, the automatic document feeder 3 is not limited to a conveying means for reading a document passing through by the scanner 2 and may be a conveying means which includes a close-contact-type line sensor therein and reads one side or both sides of the document 9.

A structure in which the conveying part 33 is arranged in the right half and the operation panel 6 is arranged in the left half can be employed. The operation panel 6 may be arranged near the center in the horizontal direction M2.

In conjunction with switching of placing directions between vertical placement/horizontal placement of the operation panel 6, the operation screen displayed by the touch panel display 61 can be switched between portrait/landscape.

In addition, the configuration, shape, size condition, function, and the like of the whole or each part of image forming apparatus 1 and the image reading apparatus 1A can be appropriately changed according to the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus for reading an image from a sheet, the image reading apparatus comprising:
a scanner including a platen glass on which the sheet can be placed; a sheet conveyer that rotates around an axis on a rear surface side and is provided to be openable/closable so as to be a cover for covering the platen glass; and an operation panel including an image display surface having short sides and long sides, wherein
the sheet conveyer includes a document tray, a sheet discharge surface provided below the document tray, and a conveying part which is arranged at one side of the document tray in a horizontal direction as viewed from a front side and conveys the sheet from the document tray to the sheet discharge surface, and
the operation panel is arranged in a positional range not overlapping with the conveying part in the horizontal direction so that, in a portrait orientation, the image display surface faces obliquely forward and upward as viewed from the front side, and is arranged at a position on the front side of the platen glass and at a position higher than the sheet discharge surface, wherein
the operation panel is provided to be rotatable at least 90 degrees by a rotation axis so that a direction of the operation panel is switched between a vertical direction and a horizontal direction in a state where the image display surface faces obliquely forward and upward.

2. The image reading apparatus according to claim 1, wherein the image display surface is a touch input surface of a touch panel display.

3. The image reading apparatus according to claim 1, wherein the operation panel is not projected from the scanner in the horizontal direction.

4. The image reading apparatus according to claim 1, wherein
an upper end position of the operation panel when the image display surface is vertically placed is higher than the sheet discharge surface, and the upper end position of the operation panel when the image display surface is horizontally placed is lower than the upper end position when the image display surface is vertically placed.

5. The image reading apparatus according to claim 1, wherein
the rotation axis of the operation panel is provided closer to a side away from the conveying part relative to a center of the operation panel in the horizontal direction when the image display surface is horizontally placed.

6. The image reading apparatus according to claim 1, wherein
the operation panel when the image display surface is vertically placed is positioned in a movable range of the conveying part and not in a movable range of the sheet discharge surface in a movable range of the sheet conveyer when being opened/closed as viewed from a side of a side surface.

7. An image reading apparatus for reading an image from a sheet, the image reading apparatus comprising:
a scanner including a platen glass on which the sheet can be placed;
a sheet conveyer that rotates around an axis on a rear surface side and is provided to be openable/closable so as to be a cover for covering the platen glass; and an operation panel including a rectangular image display surface having short sides and long sides, wherein the sheet conveyer includes a document tray, a sheet discharge surface provided below the document tray, and a conveying part which is arranged at one side of the document tray in a horizontal direction as viewed from a front side and conveys the sheet from the document tray to the sheet discharge surface, and the operation panel is arranged in a positional range not overlapping with the conveying part in the horizontal direction so that the vertical image display surface faces obliquely forward and upward as viewed from the front side and has a size from a position of the platen glass on the front side and a position higher than the sheet discharge surface, wherein the operation panel is provided to be rotatable at least 90 degrees by a rotation axis so that a direction of the operation panel is switched between a vertical direction and a horizontal direction in a state where the image display surface faces obliquely forward and upward.

8. The image reading apparatus according to claim 7, wherein an upper end position of the operation panel when the image display surface is vertically placed is higher than the sheet discharge surface, and the upper end position of the operation panel when the image display surface is horizontally placed is lower than the upper end position when the image display surface is vertically placed.

9. The image reading apparatus according to claim 7, wherein the rotation axis of the operation panel is provided closer to a side away from the conveying part relative to a center of the operation panel in the horizontal direction when the image display surface is horizontally placed.

10. The image reading apparatus according to claim 7, wherein the operation panel when the image display surface is vertically placed is positioned in a movable range of the conveying part and not in a movable range of the sheet discharge surface in a movable range of the sheet conveyer when being opened/closed as viewed from a side of a side surface.

11. The image reading apparatus according to claim 7, wherein the image display surface is a touch input surface of a touch panel display.

12. The image reading apparatus according to claim 7, wherein the operation panel is not projected from the scanner in the horizontal direction.

* * * * *